United States Patent [19]

Lin et al.

[11] Patent Number: 5,275,018

[45] Date of Patent: Jan. 4, 1994

[54] PORTABLE BEACH ACCESSORY

[76] Inventors: Yuan Lin, 2/F, 16 Chung Yang S. Rd., Sec. 2, Peitou Dist., Taipei City; Chung H. Lee, 5 Lane 124 Tatung Rd., Tanshui Town, Taipei Hsien, both of Taiwan

[21] Appl. No.: 881,090

[22] Filed: May 11, 1992

[51] Int. Cl.⁵ .............................................. F25D 3/08
[52] U.S. Cl. ................................. 62/457.7; 220/694
[58] Field of Search .......................... 62/457.1, 457.7; 220/694

[56] References Cited

U.S. PATENT DOCUMENTS

| | | | |
|---|---|---|---|
| 2,989,115 | 6/1961 | Egles | 220/694 X |
| 4,449,378 | 5/1984 | Thorpe | 62/457.1 X |
| 4,571,740 | 2/1986 | Kirby et al. | 62/457.1 X |
| 4,640,392 | 2/1987 | Decker, Jr. et al. | 220/694 X |
| 4,873,841 | 10/1989 | Bradshaw et al. | 62/457.1 X |
| 4,939,912 | 7/1990 | Leonovich, Jr. | 62/457.1 |
| 5,076,405 | 12/1991 | Modica | 62/457.7 X |
| 5,154,158 | 10/1992 | Lindsey | 62/457.7 X |

*Primary Examiner*—William E. Tapolcai
*Attorney, Agent, or Firm*—Jacobson, Price, Holman & Stern

[57] ABSTRACT

A set of appliances for bathing beach which consists of an ice box, a rear box cover, a rest plate, two armrests, a sunshade and a mat, wherein the ice box has a box body similar to that for fishing, of which the improvement includes the following: a wide and deep groove on the front side of box body to install a rest plate as the head or back rest, two armrests on the front two sides of box body are adjustable up and down, a container with a movable cover on the inner side at the bottom of box body contains a sunshade, a sunshade holder on the left rear upper side is designed to insert the sunshade therein and the angle of said holder is adjustable, and a support on the back of box body is designed to support the rear box cover which is in a bevel state so as to let the user lie down thereon; the rear box cover is a shallow U-cover body of which the lower inner side is provided with an automatic rolling (winding) device similar to that of car window curtain or shop rolling door, the cover body is pivotally fixed to the two lower rear corners of ice box body through the two preset lugs on the front two sides of the cover body; when to open the rear box cover and stretch the support to be disposed on one of the protuberances inside the rear box cover so as to keep the ice box body in a suitable bevel state the mat can be pulled out for the user to lie down on the mat which is on the ice box body, and at the same time, the user may open the movable cover to take out the sunshade from the container and insert the sunshade into the sunshade holder and then open the sunshade for shading from the sun, and particularly, the user may take out the rest plate as his head or back rest and open and fix the two armrests when he lies down on the mat.

18 Claims, 4 Drawing Sheets

PORTABLE BEACH ACCESSORY

BACKGROUND OF THE INVENTION

Prior to the instant invention, when a person went on an excursion to the beach for example they had to bring with them all the required accessories such as an ice box, a seat, a sunshade and a mat, etc. In is inconvenient to use and store these accessories and easy to forget to take all of them with you when you leave. As the standard of living increases leisure activities such as swimming and sunbathing at the beach in summer are also increasing in popularity. In view of the above, the present invention provides a portable beach accessory which is very convenient to take to the beach and use and store thereafter.

The object of the present invention is to offer a portable beach accessory which is convenient to take to the beach and use. By opening the rear box cover or base of an ice box and adjusting the support arms thereof by positioning them into one of the indents or recesses in the base the ice box body is provided at a stable inclined angle. The mat can be pulled out and the user can lean on the ice box body, and lie on the mat when resting. By removing the movable cover of the container a sunshade may be opened so as to shade the user from the sun. A rest plate may also be removed to form the user's head or back rest, and a pair of armrests amy be extended on which the user may rest their arms.

DETAILED DESCRIPTION

Figure 2:
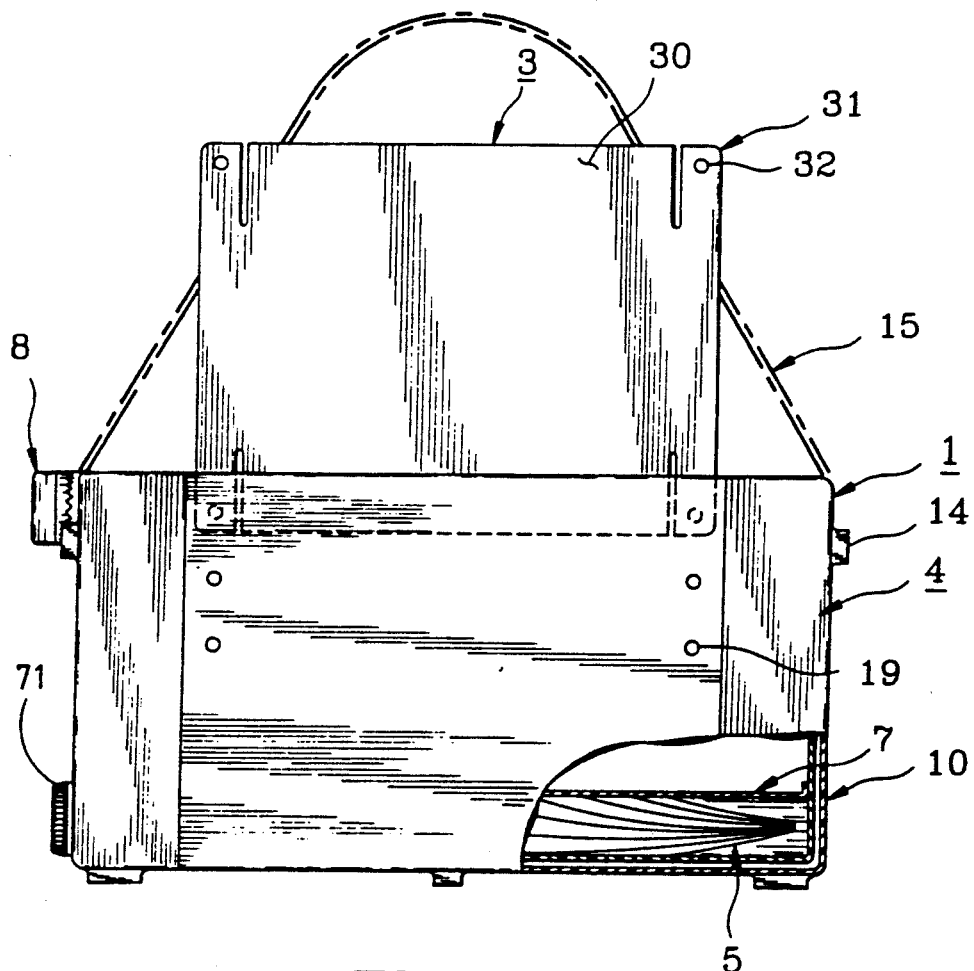
FIG. 2 is a front view and a partial sectional view of the present invention.
Figure 3:
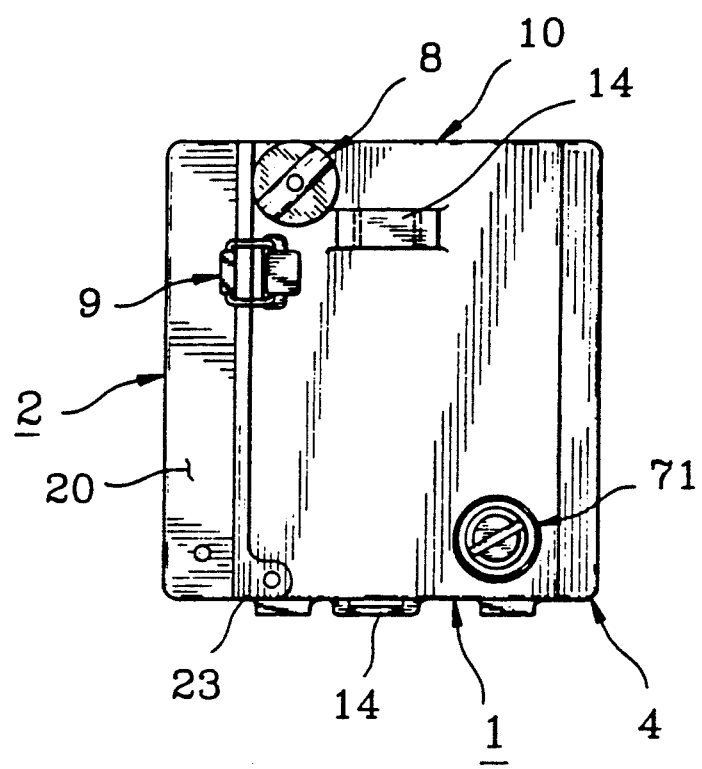
FIG. 3 is a side view of the present invention.
Figure 4:
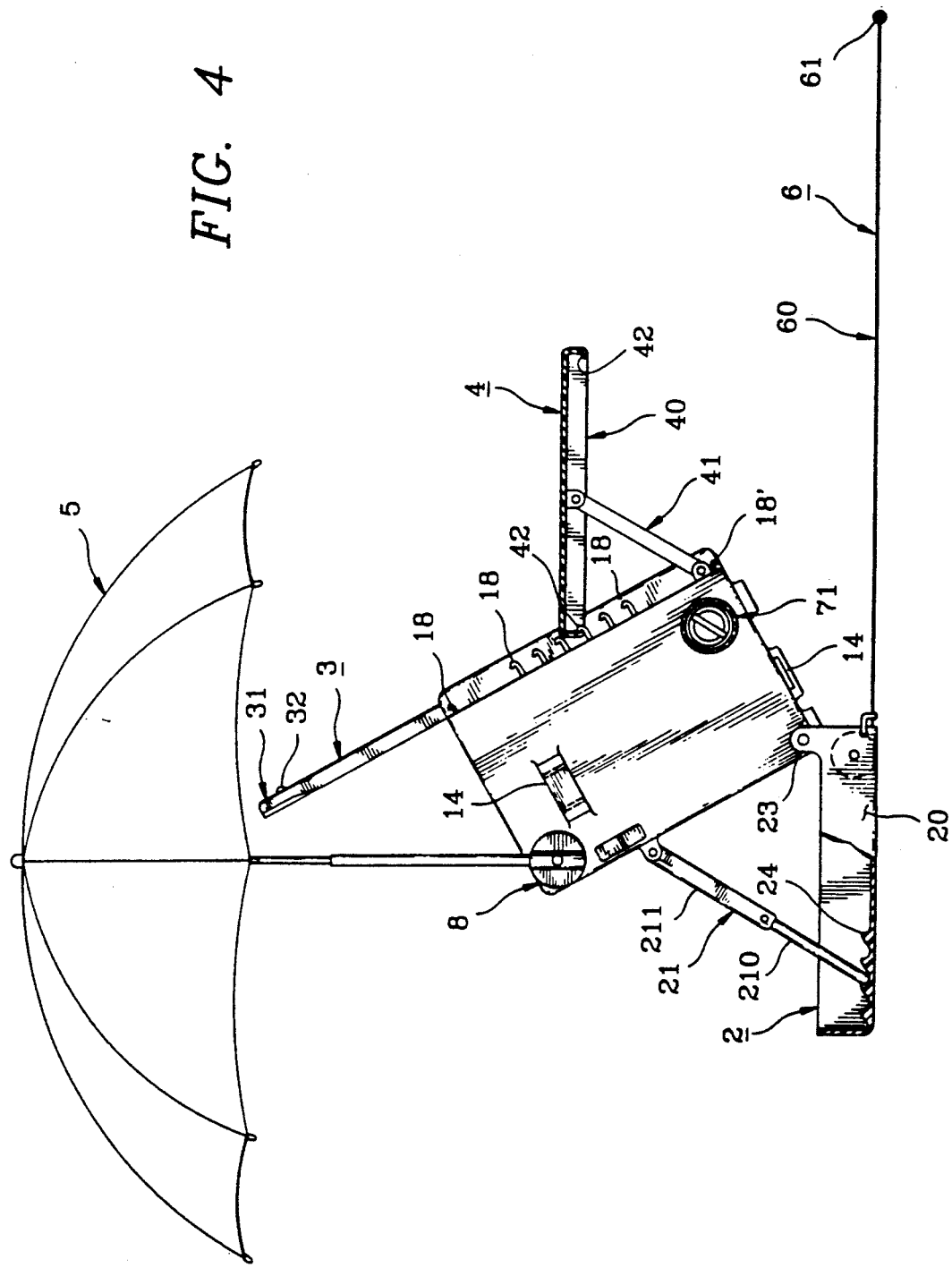
FIG. 4 is a side view and a partial sectional view of the present invention.

The present invention can be best described in conjunction with the accompanying drawings as follows:

As shown in FIG. 4 and 2, a portable beach accessory for use at the beach for example consists of an ice box or cooler 1, a rear box cover or removable base 2, a head and back rest plate 3, two armrests 4, a sunshade 5 and a flexible mat 6.

Figure 1:
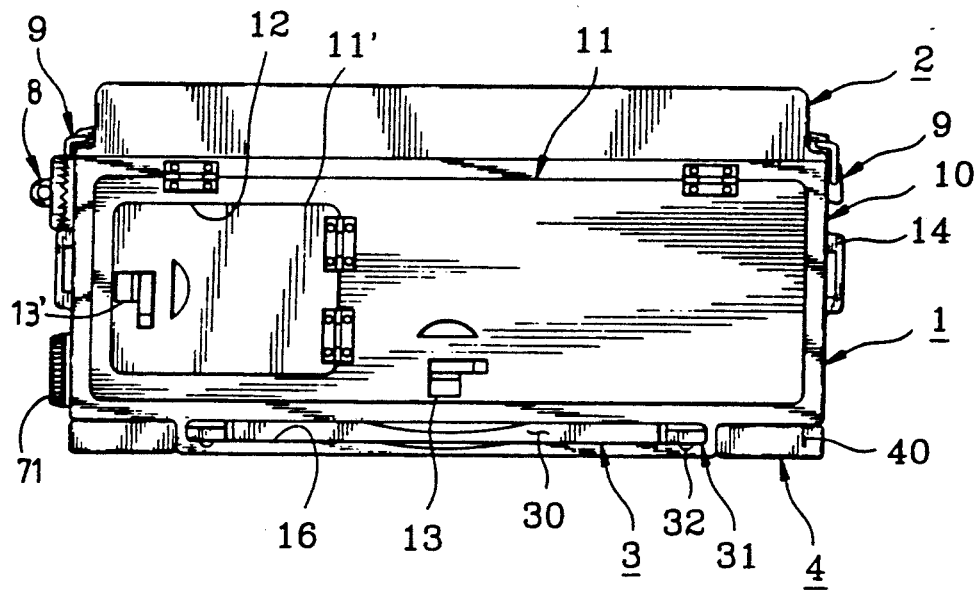
FIG. 1 is a top view of the present invention.

The body 10 of cooler 1 is similar to that used for fishing and is provided with a cover plate 11 having one or two movable fasteners 13 (as shown in FIG. 1) for securing the cover plate 11, but the movable fastener 13 may be optionally released to open the cover plate 11 so as to take out the beverage or other food such as fruit from the body 10 or put the beverage or food in the body 10.

In order to more conveniently remove the beverage or other food from the ice box body 10, a small window 12 is provided through the cover plate 11 and covered with a small cover plate 11' having a movable fastener 13' so that by releasing the movable fastener 13' and opening the small cover plate 11', the beverage and other food can be removed from the ice box without a substantial increase in the temperature inside the ice box 1.

Several belt holders 14 are provided on opposing side walls and base of the body 10 and a carrying belt 15 passes therethrough (as shown in FIG. 2) so that the user can carry the present invention on their back.

Figure 5:
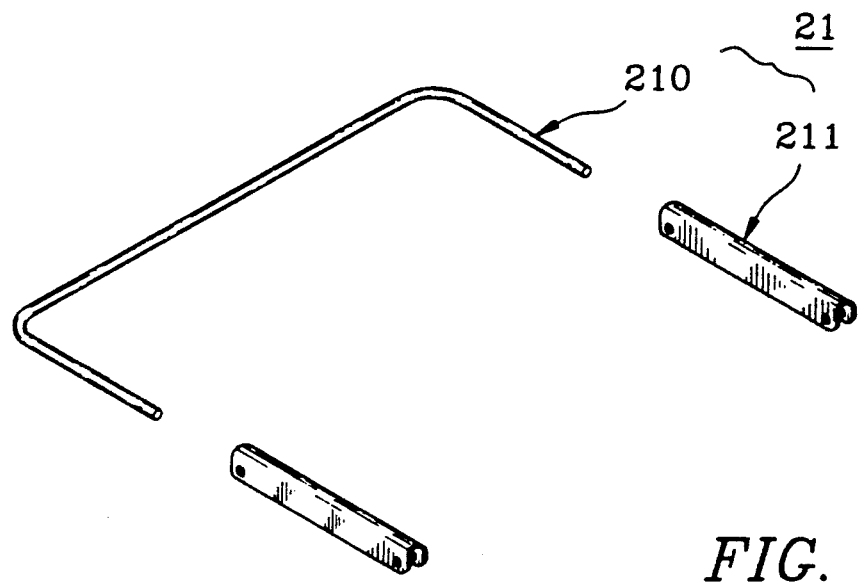
FIG. 5 is a partial exploded view of the support arms of the present invention.

A wide and deep groove 16 on the front face of body 10 is provided with a plate 3 providing a head and back rest. A pair of armrests each consisting of an armrest plate 40, a support rod 41 which is pivotally connected to each armrest plate 40 and pivotally connected to the body 10 on a front lower portion thereof. A container 7 with a removable cap 71 (as shown in FIG. 2) is provided in the bottom of the body 10 for storing a closed sunshade 5. A sunshader holder 8 is pivotally mounted in a position near the base and one edge of the body 10 which has attachment means for the sunshade. The sunshade is inserted in the holder 8 and the angle of the holder 8 is adjustable. Holding means for retaining the cooler at the desired inclined angle is provided in the form of a support member 21 which comprises a U-shaped frame 210 and a pair of support rods 211 (as shown in FIG. 5) which are pivotally attached to the base of the body 10 for supporting a rear box cover 2 such that the user may rest thereagainst (as shown in FIG. 4).

The rear box cover 2 comprises a shallow U-shaped body 20, and an automatic roller/winding device is mounted for rotation between a pair of lugs 23 on the cover body. The roller device 22 is similar to a window blind holder but is designed to hold a mat 6 inside the body 20.

Several protuberances 24 with recesses or slots therebetween are provided on the inside surface of rear box cover body 20 (as shown in FIG. 4) so that when the cover body 20 is opened, the support 21 may be abut one of the protuberances 24 in the cover body 20 so as to keep the ice box body 10 in a suitably angled position (as shown in FIG. 4). The mat 6 can be pulled and the user of the device can lean against the ice box body 10 and rest on the mat 6 when taking a rest.

When taking a rest as mentioned above, the user may remove the cap 71 and take out the sunshade 5 from the container 7 and insert the sunshade 5 into the sunshade holder 8 and open the sunshade 5 to shade from the sun. To avoid direct contact with the sand, the user may pull out the mat 6 to a suitable length and lie or sit down on the mat 6 (as shown in FIG. 4). The ice box body 10 may be used as a back rest, and the rest plate 3 may be extended to form a head and back rest.

Figure 6:
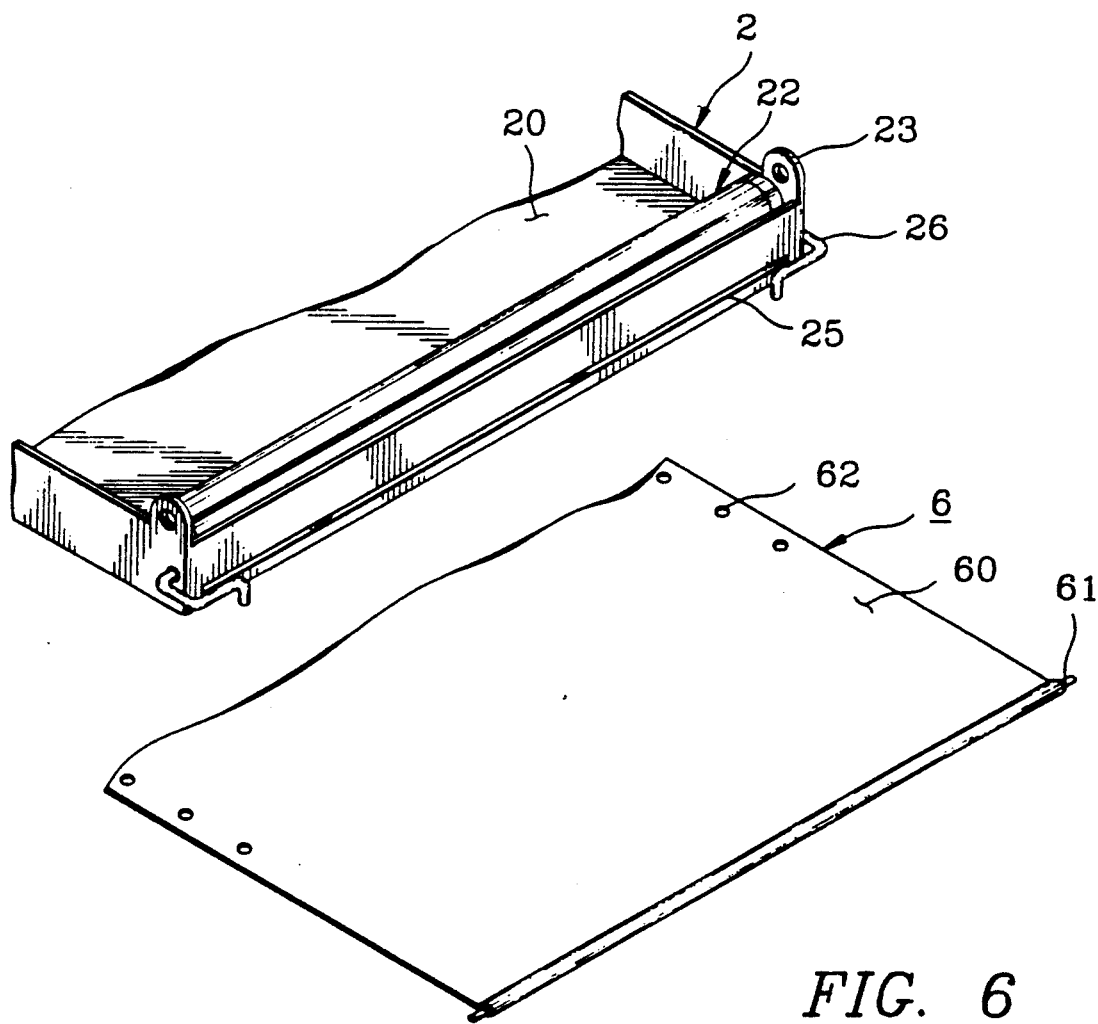
FIG. 6 is a partial exploded view of the base and mat of the present invention.

With reference to FIG. 6, the mat body 60 is made of a strong, fairly heat-resistant material. The two side edges of the mat body 60 are provided with several holes 62, the front edge thereof is fixed on a bar 61 made of metal for example, and the rear end thereof is fixed on the roller device 22 which is installed on the rear box cover 2. The cover body 20 has an elongate aperture 25 through which the mat body 60 extends and a pair of S-hooks 26 are pivotally fixed at either end of the aperture 25. To use the mat 6, the bar 61 is pulled out from the cover body 20 to a suitable length, and the two S-hooks 26 pass through the holes 62 on each side of the mat body 60 to keep the mat body 60 in a stretched and fixed state so that the user can lie or sit down on the mat body 60. After use, by pulling the bar 61 slightly and then releasing it, the automatic roller device 22 can roll the mat 6 up for storage in the cover body 20 and provides a convenient means for storing the mat 6 so that the device is easy to carry.

In order to adjust the armrest plates 40 of armrest 4 to the horizontal position shown in FIG. 4 regardless of the angle of ice box body 10, several lugs or hook-shaped members 18 may be provided along the two sides of the box body 10 and the lower edges of each end of the armrest plate 40 may be provided with a corresponding engaging edge 42 so that, depending on the angle of ice box body 10 during use, the proximal end of armrest plate 40 may be engaged with a suitable lug or hook-shaped member 18 so as to keep the armrest plate 40 of armrest 4 in the substantially horizontal position. A pair of opposed lugs or hook-shaped members 18 and 18' respectively are provided at the highest and lowest edges on each side of ice box body 10 so as to secure the armrest plate 40 in the storage position as shown in FIGS. 1 and 2 to make it convenient for the user to carry the device when not in use.

As shown in FIGS. 1, 2 and 4, the rest plate 3 is a plate body 30 contained within the wide and deep groove 16 on the front face of ice box body 10 when in the storage position and a elastic piece 31 with lugs 32 at each of the four corners of the plate body 30 so that when the plate body 20 is installed in the wide and deep groove 16, the lugs 32 are engaged in the corresponding snap holes 19 provided in the ice box body 10 as shown in FIG. 2 to hold the rest plate body in the desired extension from the body. The lugs 32 may be depressed so as to store the rest plate body 30 in the wide and deep groove 16.

We claim:

1. A portable beach accessory comprising:
   a) a food and beverage cooler;
   b) a base pivotally mounted on the cooler;
   c) holding means on the cooler for retaining the cooler at a desired angle relative to the base so that a person can rest thereagainst;
   d) a container in the cooler for holding a sunshade; and
   e) an extendable plate member able to form a head and back rest reversibly positionable in a slot in a front face of the cooler.

2. The portable beach accessory of claim 1, comprising a pair of arm rests mounted on the cooler.

3. The portable beach accessory of claim 2 wherein said arm rests are pivotally mounted on the cooler by a pair of support arms and a plurality of lugs are provided along each edge of the front face of the cooler which are engagable with one end of each of the arm rests to enable the arm rests to be provided in a substantially horizontal position when the cooler is provided at the desired angle.

4. The portable beach accessory of claim 3, including a pair of opposed lugs for holding each arm rest in a storage position wherein the arm rests are substantially parallel to the front face of the cooler.

5. The portable beach accessory of claim 1 including the sunshade in the container.

6. The portable beach accessory of claim 5 including a pivotal member mounted on an outside surface of the cooler, said pivotal member having attachment means for attaching said sunshade and said pivotal member being adjustable so as to provide the sunshade at a desired angle.

7. The portable beach accessory of claim 1 wherein said holding means comprises a support member pivotally mounted on the cooler and a plurality of recesses or slots provided in an upwardly facing surface of the base, part of the support member being positionable in said recesses or slots for retaining the cooler at the desired angle.

8. The portable beach accessory of claim 1 having a carrying strap attached thereto.

9. The portable beach accessory of claim 1 wherein the extendable plate member has a two or more lugs engagable with corresponding indents or apertures in the front face of the cooler for holding the plate member in the desired position so as to form the head and back rest.

10. The portable beach accessory of claim 1, comprising a flexible mat stored within a compartment of the cooler, able to be extended through a slot in the front face of the cooler.

11. The portable beach accessory of claim 10 wherein the mat is stored on an elongate roller mounted for rotation within the cooler and having means for automatically winding the mat around the roller.

12. The portable beach accessory of claim 11 having a plurality of apertures through each side edge of the mat and a pair of members attached to the cooler which are insertable therethrough so as to hold the mat in an extended position.

13. The portable beach accessory of claim 1 wherein the elongate aperture for holding the sunshade is covered by a removable cap.

14. A portable beach accessory comprising:
   a) a food and beverage cooler;
   b) adjustment means on the cooler for providing the cooler at an inclined angle so that a person can rest thereagainst;
   c) a head and back rest provided on the cooler;
   d) a pair of arm rests on the cooler; and
   e) a flexible, extendable mat attached to the cooler.

15. The portable beach accessory of claim 14 including a sunshade.

16. A portable beach accessory comprising:
   a) a food and beverage cooler;
   b) a sunshade provided in a container in the cooler;
   c) a movable member on the cooler having attachment means for the sunshade, the movable member able to be adjusted so as to provide the sunshade at a desired angle in use; and
   d) adjustment means on the cooler for providing the cooler at an inclined angle so a person can rest thereagainst.

17. The portable beach accessory of claim 16 comprising a flexible mat attached to the cooler.

18. The portable beach accessory of claim 16 wherein the adjustment means comprises a base pivotally connected to the cooler providing a plurality of slots or recesses and a support member pivotally connected to the cooler which is positionable in the slots or recesses so as to provide the cooler at the inclined angle.

* * * * *